(12) United States Patent
Kim

(10) Patent No.: US 11,755,248 B2
(45) Date of Patent: Sep. 12, 2023

(54) MEMORY SYSTEM AND OPERATING METHOD OF MEMORY SYSTEM

(71) Applicant: SK hynix Inc., Gyeonggi-do (KR)

(72) Inventor: Jung Woo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 112 days.

(21) Appl. No.: 17/569,979

(22) Filed: Jan. 6, 2022

(65) Prior Publication Data

US 2023/0063280 A1    Mar. 2, 2023

(30) Foreign Application Priority Data

Aug. 27, 2021   (KR) ........................ 10-2021-0113645

(51) Int. Cl.
  *G06F 3/06*  (2006.01)
(52) U.S. Cl.
  CPC .......... *G06F 3/0659* (2013.01); *G06F 3/0604* (2013.01); *G06F 3/0679* (2013.01)
(58) Field of Classification Search
  CPC ...... G06F 3/061; G06F 3/0653; G06F 3/0656; G06F 3/0673; G06F 2212/6024; G06F 2212/6026; G06F 12/0862
  See application file for complete search history.

(56) References Cited

U.S. PATENT DOCUMENTS

| 2016/0321183 A1* | 11/2016 | Govindan | G06F 1/3296 |
| 2019/0065376 A1* | 2/2019 | Lee | G06F 12/0862 |
| 2019/0317901 A1* | 10/2019 | Kachare | G06F 3/0688 |
| 2021/0247916 A1* | 8/2021 | Jung | G06F 3/0634 |

FOREIGN PATENT DOCUMENTS

| KR | 10-2014-0130309 A | 11/2014 |
| KR | 10-1735590 B1 | 5/2017 |

* cited by examiner

*Primary Examiner* — Tracy A Warren
(74) *Attorney, Agent, or Firm* — IP & T GROUP LLP

(57) ABSTRACT

Embodiments of the present disclosure relate to a memory system and an operating method of the memory system. According to embodiments of the present disclosure, the memory system may determine, according to a time period to which the length of the idle time belongs among a plurality of set time periods, a command pattern indicating a command type of a command expected to be received from the host, and may execute an operation corresponding to the command pattern. In this case, the type of command may be a read command, a write command, or an erase command, and the command pattern may be a read pattern, a write pattern, or an erase pattern.

20 Claims, 16 Drawing Sheets

FIG.6

| Length of idle time | Pattern |
|---|---|
| T < A1 | Read |
| A1 <= T < A2 | Write |
| ... | ... |
| AN-1 <= T < AN | Erase |
| T >= AN | Read |

FIG. 11
Command pattern = Read pattern
Length of idle time → 2nd Time period
| Referenced address |
|---|
| A |
| B |
| C |
| ... |
| B |
| A |
| ... |
the number of duplicate references for address
| Referenced address | The number of duplicate references |
|---|---|
| A | 3 |
| B | 5 |
| C | 2 |
| ... | ... |
 Target address = B

MEMORY SYSTEM AND OPERATING METHOD OF MEMORY SYSTEM

CROSS-REFERENCE TO RELATED APPLICATION

The present application claims priority under 35 U.S.C. 119(a) to Korean patent application number 10-2021-0113645 filed on Aug. 27, 2021, which is incorporated herein by reference in its entirety.

TECHNICAL FIELD

Embodiments of the present disclosure relate to a memory system and an operating method of the memory system.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

In general, a memory system executes an operation indicated by the corresponding command after receiving a command from a host. For example, after receiving a read command from the host, the memory system may load data requested by the read command from a memory device to a memory controller. However, the memory system does not execute an operation for processing the expected command by anticipating a command that is likely to be input from the host in advance.

SUMMARY

Embodiments of the present disclosure may provide a memory system and an operating method of the memory system capable of processing commands received from the host faster.

In one aspect, embodiments of the present disclosure may provide a memory system including a memory device for storing data, and a memory controller configured to control the memory device to execute a command received from a host, to determine, according to a time period to which a length of idle time belongs among a plurality of set time periods, a command pattern indicating a command type of a command expected to be received from the host, and to execute an operation corresponding to the command pattern. The idle time may be a time period in which a command is not received from the host.

In this case, the command type may be a read command, a write command, an erase command or a background command.

The command pattern may be 1) a read pattern, 2) a write pattern, 3) an erase pattern, or 4) a background pattern.

The memory controller may determine, when the length of the idle time belongs to a first time period among the plurality of time periods, the command pattern based on history information corresponding to the first time period. In this case, the history information corresponding to the first time period may include information on a command previously received from the host after a previous idle time belonging to the first time period has elapsed.

In another aspect, embodiments of the present disclosure may provide an operating method of a memory system including calculating a length of idle time, which is a time period in which a command has not been received from a host, determining, according to a time period to which the length of the idle time belongs among a plurality of set time periods, a command pattern indicating a command type of a command expected to be received from the host, and executing an operation corresponding to the command pattern.

In this case, the command type may be a read command, a write command, an erase command or a background command.

The command pattern may be 1) a read pattern, 2) a write pattern, 3) an erase pattern, or 4) a background pattern.

The determining the command pattern may include determining, when the length of the idle time belongs to a first time period among the plurality of time periods, the command pattern based on history information corresponding to the first time period. In this case, the history information corresponding to the first time period may include information on a command previously received from the host after a previous idle time belonging to the first time period has elapsed.

According to embodiments of the present disclosure, it is possible to process the commands received from the host more quickly.

BRIEF DESCRIPTION OF THE DRAWINGS

FIG. 6 illustrates an example of a command pattern according to the length of the idle time according to embodiments of the present disclosure.

FIG. 11 illustrates an example in which a memory system determines a target address according to embodiments of the present disclosure.

DETAILED DESCRIPTION

Figure 1:
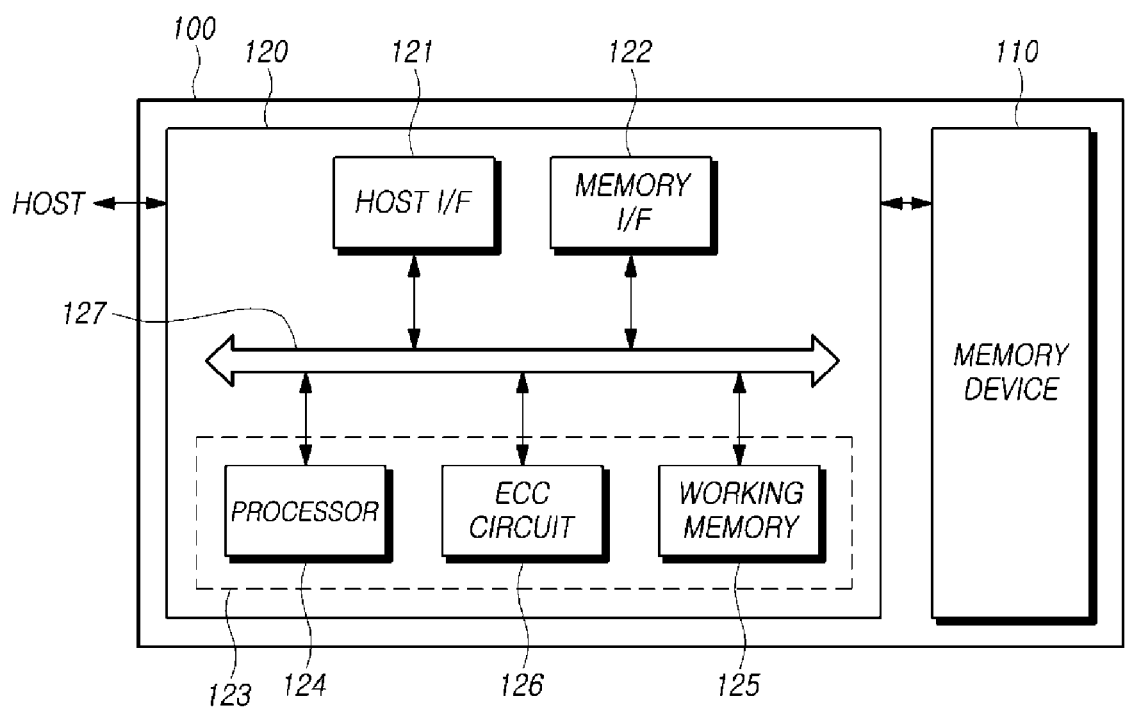
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all of the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
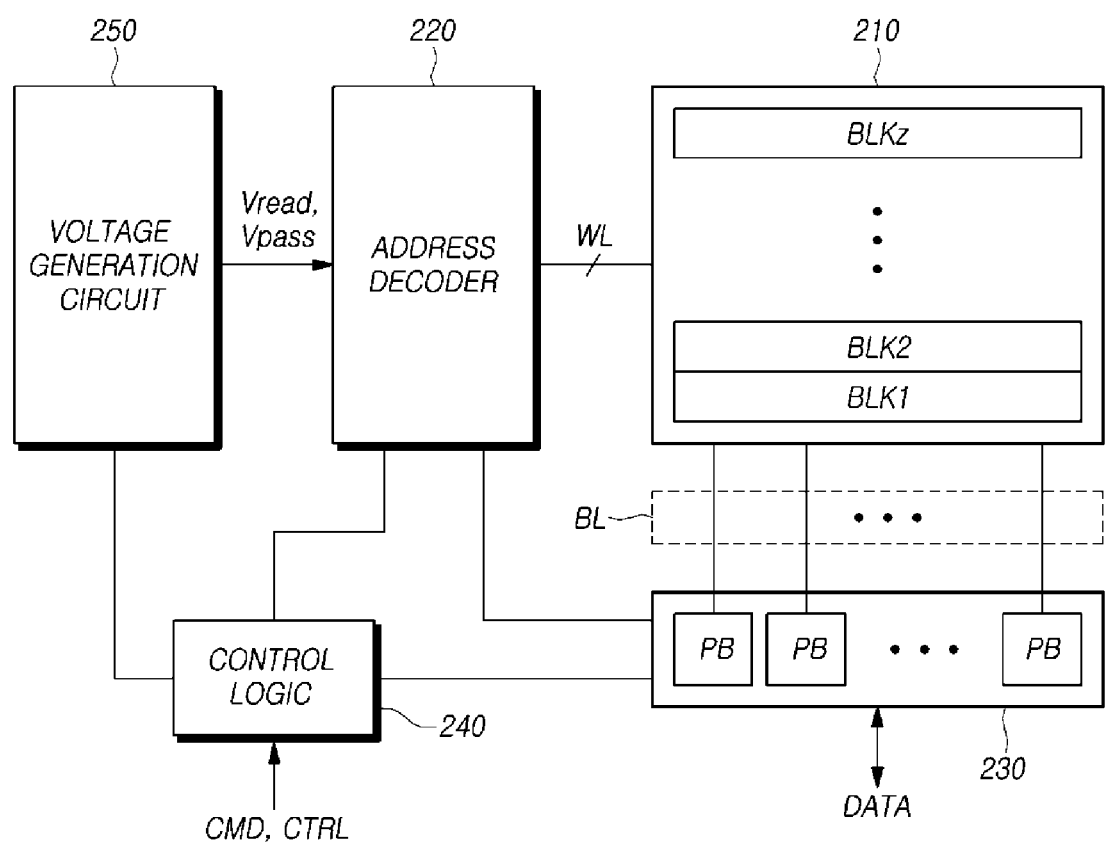
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
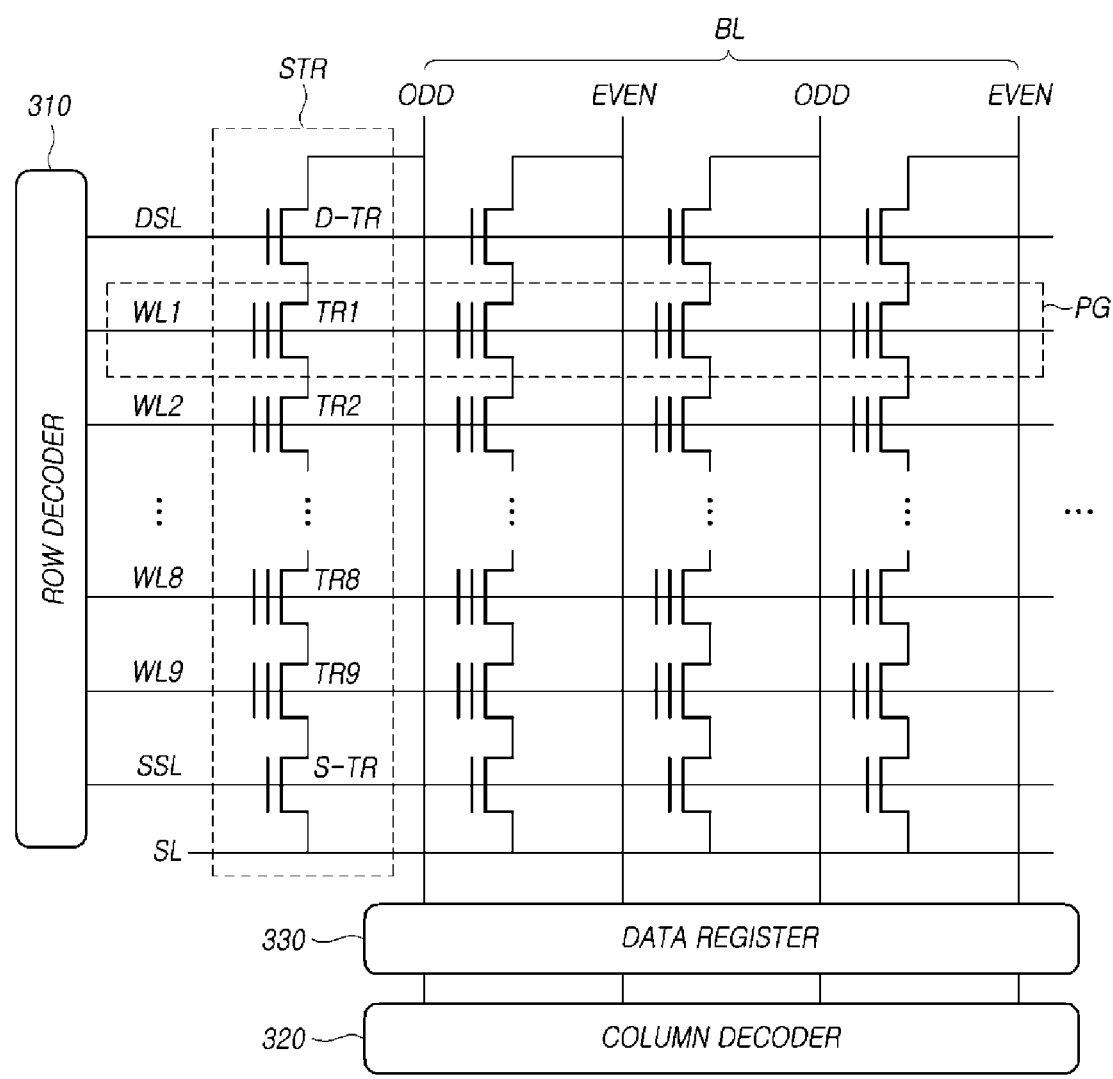
FIG. 3 illustrates a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
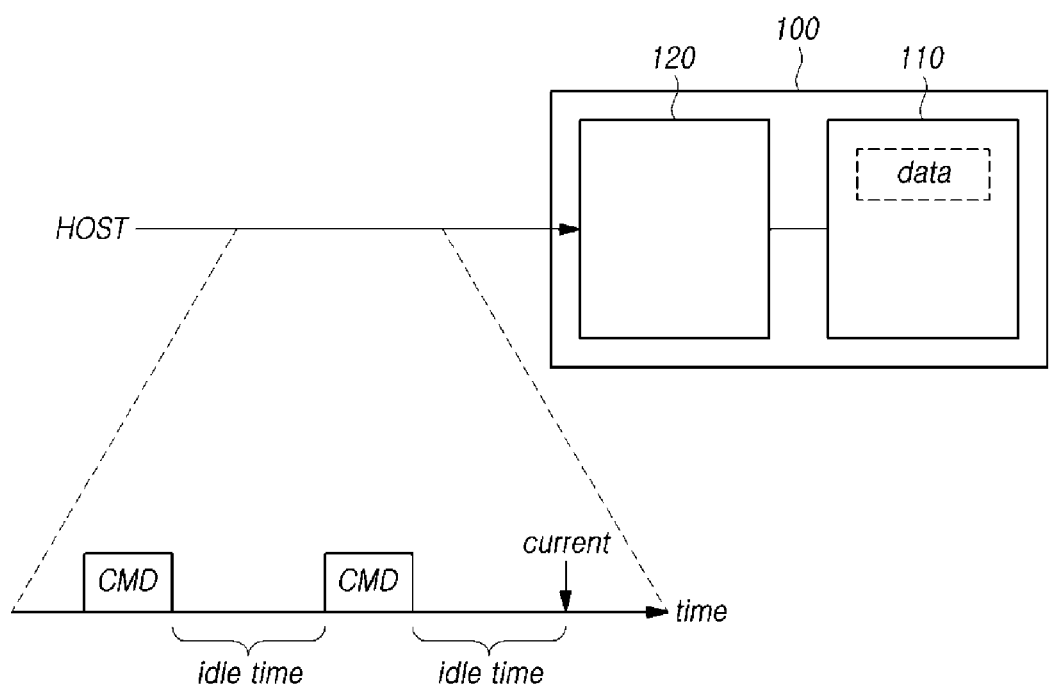
FIG. 4 illustrates a schematic structure of a memory system according to embodiments of the present disclosure.

FIG. 4 illustrates a schematic structure of a memory system 100 according to embodiments of the present disclosure.

Referring to FIG. 4, the memory system 100 may include a memory device 110 and a memory controller 120.

The memory device 110 may store data. For example, the memory device 110 may store data requested to be written by a host HOST.

In addition, the memory controller 120 may control the memory device 110 to execute a command CMD received from the host HOST.

In this case, a type of the command CMD received from the host HOST may be a read command for requesting to read data stored in the memory device 110, a write command requesting to write data to the memory device 110, an erase command requesting to erase a specific area (e.g., memory block) of the memory device 110, or a background command for requesting to execute a background operation (e.g., garbage collection (GC), wear leveling (WL), read-reclaim (RR)) for the memory device 110.

The memory controller 120 may calculate a length of an idle time, which is a time period in which a command is not received from the host HOST. For example, the unit of the length of the idle time may be seconds, minutes, hours, or a CPU clock.

For example, the length of the idle time may be defined as a difference between a time when the memory controller 120 most recently receives a command from the host and a reference time (e.g., current time). For example, if the time when the memory controller 120 most recently receives a command from the host HOST is 10 minutes before the current time, the length of the idle time may be defined as 10 minutes. For example, the reference time may be a time at which an operation described in FIGS. 5 to 15 is executed or it may be a time before that. The current time may be a time that the memory controller 120 calculate a length of an idle time As another example, the length of the idle time may be defined as a difference between time points of receiving two different commands from the host (HOST). For example, if the memory controller 120 receives a command from the host HOST and receives another command from the host HOST 20 minutes later, the length of the idle time may be defined as 20 minutes.

If a new command is received from the host HOST, the memory controller 120 may recalculate the length of the idle time based on the received new command.

In embodiments of the present disclosure, the memory system 100 may expect a command that is likely to be received from the host HOST later, based on the length of the idle time, and may execute an operation in advance to process the expected command faster.

According to the length of the idle time, there may vary a command that the memory system 100 is likely to receive from the host HOST in the future. For example, if the idle time is less than 30 minutes, the memory system 100 is highly likely to receive a read command from the host HOST, and if the idle time is 30 minutes or more, the memory system 100 more likely to receive a write command from the host HOST.

Figure 5:
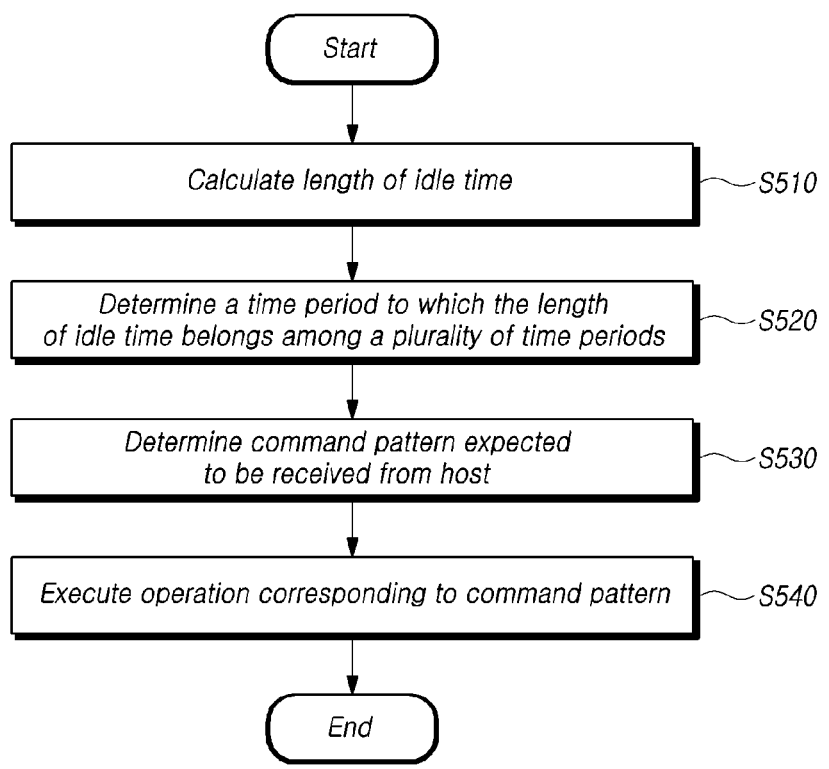
FIG. 5 is a flowchart illustrating an example of an operation of a memory system according to embodiments of the present disclosure.

FIG. 5 is a flowchart illustrating an example of an operation of a memory system 100 according to embodiments of the present disclosure. The operation of a memory system 100 illustrated in FIG. 5 may be performed periodically or at a specific time point.

Referring to FIG. 5, the memory controller 120 of the memory system 100 may calculate the length of the idle time (S510). The memory controller 120 may calculate the length of the idle time according to the method described with reference to FIG. 4.

In addition, the memory controller 120 may determine a time period to which the length of the idle time belongs among the plurality of time periods (S520). In this case, a plurality of time periods (e.g., 10 minutes to 1 hour, 1 hour to 10 hours) may be preset.

In addition, the memory controller 120 may determine a command pattern indicating the command type of command expected to be received from the host HOST according to a time period to which the calculated idle time length belongs (S530).

In this case, the command pattern may be, for example, 1) a read pattern, 2) a write pattern, 3) an erase pattern, or 4) a background pattern.

The configuration that the command pattern is the read pattern means that it is expected to receive a read command from the host HOST. The write pattern as the command pattern means that it is expected to receive a write command from the host HOST. The erase pattern as the command pattern means that it is expected to receive an erase command from the host HOST. The background pattern as the command pattern means that it is expected to receive a background command from the host HOST.

The memory controller 120 may execute an operation corresponding to the determined command pattern (S540).

In this case, an expected command pattern may vary according to the length of the idle time. Hereinafter, this will be described in detail with reference to FIG. 6.

FIG. 6 illustrates an example of a command pattern according to the length of the idle time according to embodiments of the present disclosure.

Referring to FIG. 6, the memory controller 120 may determine a command pattern of a command expected to be received from the host HOST as the read pattern when the length of idle time T is less than A1.

If the length of the idle time T is greater than or equal to A1 and less than A2, the memory controller 120 may determine a command pattern of a command expected to be received from the host HOST as the write pattern.

If the length of the idle time T is greater than or equal to AN−1 and less than AN, the memory controller 120 may determine a command pattern of a command expected to be received from the host HOST as the erase pattern.

If the length of the idle time T is greater than or equal to AN, the memory controller 120 may determine a command pattern of a command expected to be received from the host HOST as the read pattern.

That is, the command pattern of a command expected to be received from the host (HOST) may vary according to the length of the idle time.

Moreover, in embodiments of the present disclosure, the command pattern of a command expected to be received from the host (HOST) may be dynamically changed according to the length of the idle time. For example, the memory controller 120 may initially determine that the command pattern of a command expected to be received from the host HOST is a read pattern when the length of the idle time is T, but thereafter, when the length of the idle time is T the memory controller may determine that the command pattern of a command expected to be received from the host is a write pattern.

Hereinafter, a detailed method of determining a command pattern of a command expected to be received by the memory system 100 from the host will be described.

Figure 7:
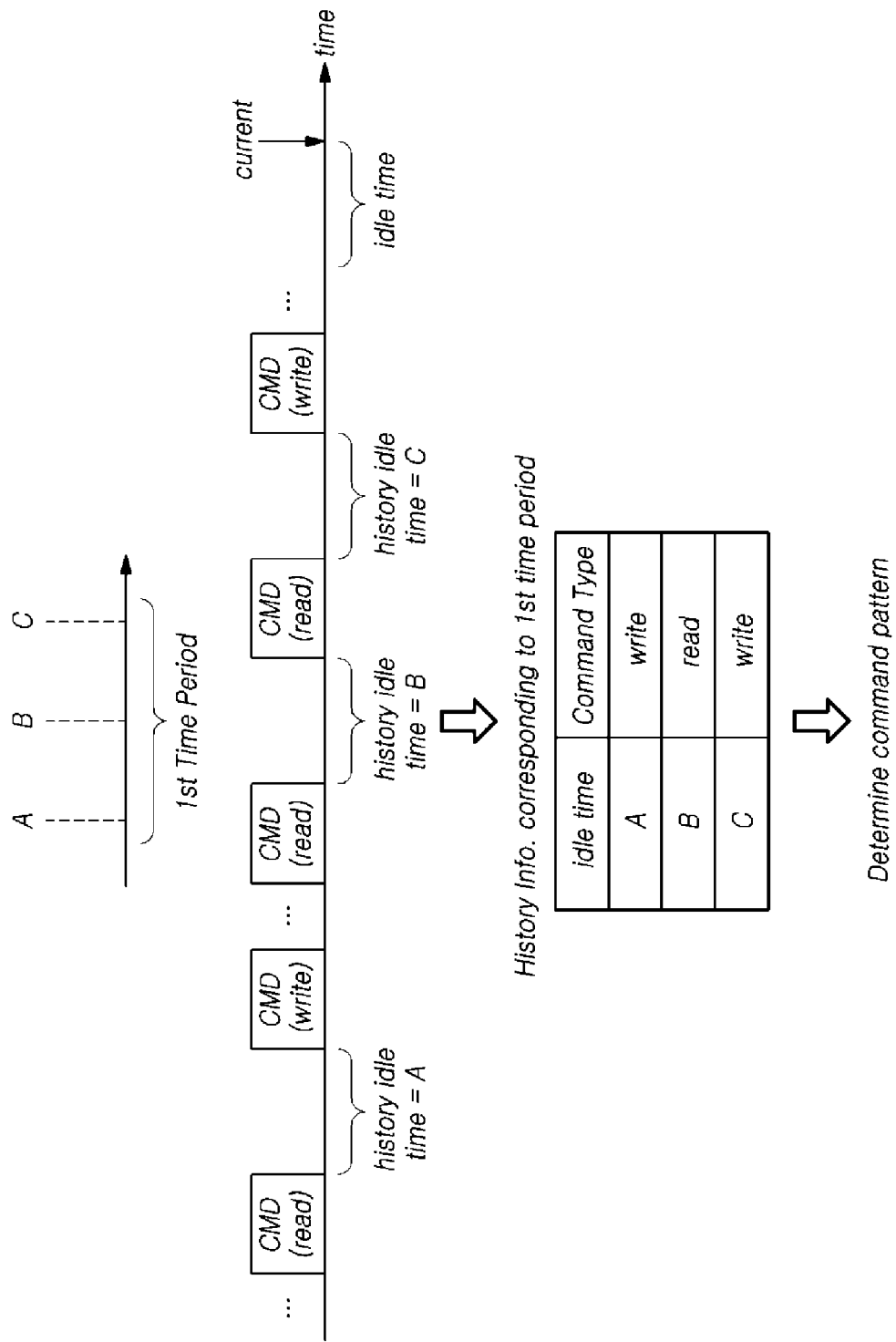
FIG. 7 illustrates an example in which a memory system according to embodiments of the present disclosure determines a command pattern based on history information corresponding to a first time period.

FIG. 7 illustrates an example in which a memory system 100 according to embodiments of the present disclosure determines a command pattern based on history information corresponding to a first time period.

Referring to FIG. 7, the memory controller 120 of the memory system 100 may determine, when the length of the idle time belongs to a first time period among a plurality of time periods, the command pattern of a command expected to be received from the host HOST based on history information corresponding to the first time period.

In this case, the history information corresponding to the first time period may include information (e.g., logical block addresses corresponding to the commands, chunk of data corresponding to command, whether of sequential/random access) on a command previously received from the host after a previous idle time belonging to the first time period has elapsed. The history information corresponding to the first time period may be managed in various types of data structures (e.g., tables, maps, lists).

For example, in FIG. 7, the memory controller 120 previously received a write command from the host after the idle time A has elapsed, received a read command from the host after the idle time B has elapsed, and received an erase command from the host after the idle time C has elapsed. In addition, in FIG. 7, the idle times A, B, and C belong to the first time period.

In this case, the memory controller 120 may determine a command pattern of a command expected to be received from the host HOST based on the history information corresponding to the first time period. In this case, the history information corresponding to the first time period may include information that the write command is received twice and the read command is received once from the host after an idle time belonging to the first time period has elapsed. In addition, the history information corresponding to the first time period may include information indicating that a write command is received from the host HOST after the most recent idle time belonging to the first time period has elapsed.

Hereinafter, it will be described a specific example in which the memory system 100 determines a command pattern of a command expected to be received from the host HOST based on history information corresponding to the first time period.

Figure 8:
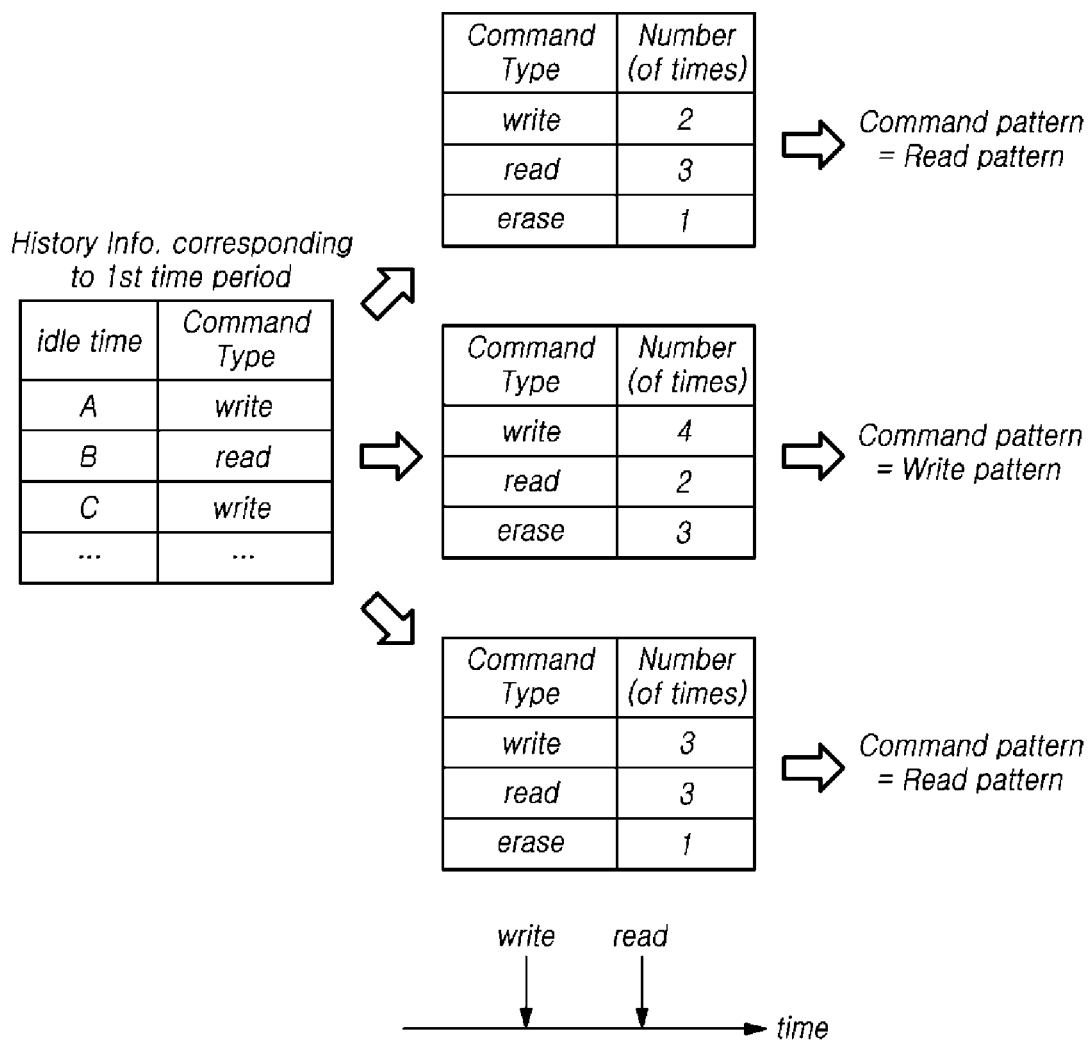
FIG. 8 illustrates an example in which a memory system determines a command pattern according to a command type of a command received from a host according to embodiments of the present disclosure.

FIG. 8 illustrates an example in which a memory system 100 determines a command pattern according to a command type of a command received from a host according to embodiments of the present disclosure.

Referring to FIG. 8, the memory controller 120 of the memory system 100 may check the number of command types received from the host HOST from the history information corresponding to the first time period. In addition, the memory controller 120 may search for a command type previously received from the host HOST with the highest frequency among them, and determine a command pattern of a command expected to be received from the host HOST based on this.

For example, in the history information corresponding to the first time period in FIG. 8, the number of times of receiving the write command from the host is 2 times, the number of times of receiving the read command from the host is 3 times, and the number of times of receiving the erase command from the host is 1 time. In this case, the memory controller 120 may determine that the command pattern of a command expected to be received from the host HOST is the read pattern since the command type previously received from the host HOST with the highest frequency is the read command.

In another example in FIG. 8, in the history information corresponding to the first time period, the number of times of receiving the write command from the host is 4 times, the number of times of receiving the read command from the host is 2 times, and the number of times of receiving the erase command from the host is 3 times. In this case, the memory controller 120 may determine that the command pattern of a command expected to be received from the host HOST is the write pattern since the command type previously received from the host HOST with the highest frequency is the write command.

Moreover, the number of command types previously received from the host with the highest frequency may be plural. In another example, in the history information corresponding to the first time period in FIG. 8, the number of times the write command is received from the host is 3 times, the number of times the read command is received from the host is also 3 times, and the number of times the erase command is received is 1 time.

In this case, the memory controller 120 may determine a command pattern according to the most recently received command type by comparing the time at which the most recent read command is received and the time at which the most recent write command is received. In FIG. 8, since the time of receiving the most recent read command is more recent than the time of receiving the most recent write command, the memory controller 120 may determine that the command pattern of a command expected to be received from the host is the read pattern.

Figure 9:
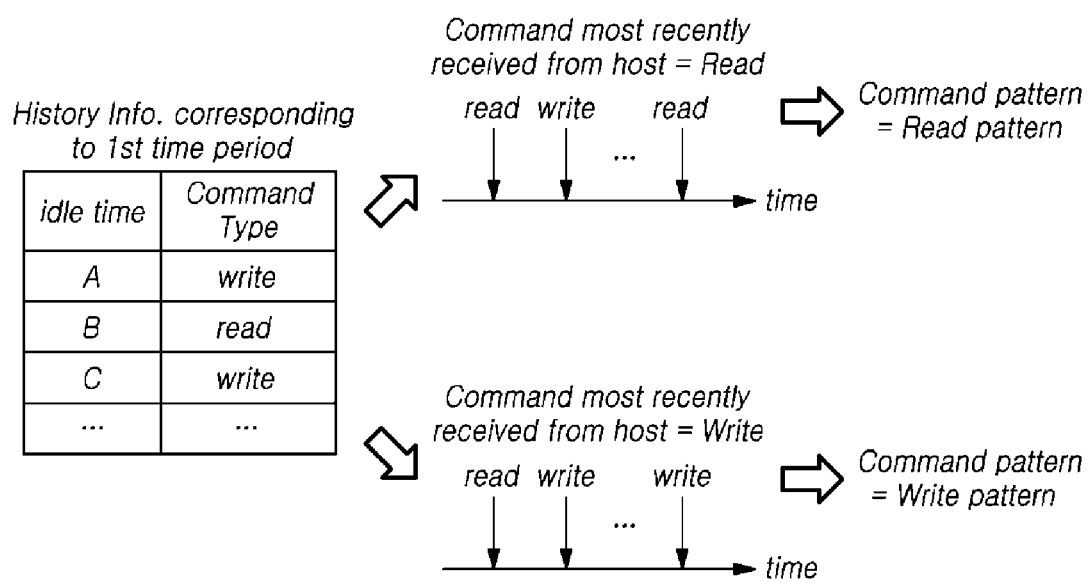
FIG. 9 illustrates an example of determining a command pattern according to the command type of a command most recently received from a host by a memory system according to embodiments of the present disclosure.

FIG. 9 illustrates an example of determining a command pattern according to the command type of a command most recently received from a host by a memory system 100 according to embodiments of the present disclosure.

Referring to FIG. 9, the memory controller 120 of the memory system 100 may search for a command type of the most recently received command from the host HOST from the history information corresponding to the first time period, and may determine a command pattern of a command expected to be received from the host HOST based on this.

In an example in FIG. 9, in the history information corresponding to the first time period, the command type of a command most recently received from the host HOST is a read command. In this case, the memory controller 120 may determine that the command pattern of a command expected to be received from the host HOST is the read pattern.

In another example, in the history information corresponding to the first time period in FIG. 9, the command type of a command most recently received from the host HOST is a write command. In this case, the memory controller 120 may determine that the command pattern of a command expected to be received from the host HOST is the write pattern.

In the above, the operation of determining a command pattern of a command expected to be received by the memory system 100 from the host HOST has been described.

Hereinafter, it will be described a specific example in which the memory system 100 executes an operation corresponding to the determined command pattern.

Figure 10:
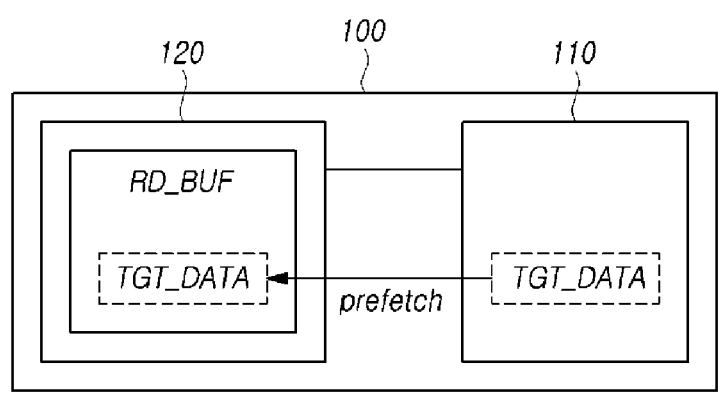
FIG. 10 illustrates an example in which a memory system according to embodiments of the present disclosure executes an operation corresponding to a command pattern.

FIG. 10 illustrates an example in which a memory system 100 according to embodiments of the present disclosure executes an operation corresponding to a command pattern.

Referring to FIG. 10, if a command pattern of a command expected to be received from the host HOST is a read pattern, the memory system 100 executes an operation corresponding to the read pattern.

In FIG. 10, the memory controller 120 may prefetch target data TGT_DATA into an internal read buffer RD_BUF.

The read buffer RD_BUF is a buffer that stores data read from a memory device 110 in order for the memory controller 120 to process a read command received from the host HOST. The read buffer RD_BUF may be located on a volatile memory. For example, the read buffer RD_BUF may be located on the working memory 125 of the memory controller 120.

The memory controller 120 of the memory system 100 may determine the target data TGT_DATA to be prefetched into the read buffer RD_BUF and prefetch the target data TGT_DATA into the read buffer RD_BUF. The target data TGT_DATA is data expected to be read by the host HOST.

That is, the memory controller 120 prefetches the target data TGT_DATA into the read buffer RD_BUF before the host HOST requests to read for the target data TGT_DATA, so that thereafter, when the host HOST requests to read for the target data TGT_DATA, the target data TGT_DATA may be directly transmitted from the read buffer RD_BUF to the host HOST. As a result, the memory controller 120 may more quickly process the read request received from the host HOST.

In order for the memory system 100 to prefetch the target data TGT_DATA stored in the memory device 110 into the read buffer RD_BUF, it is required to determine a target address, which is an address at which the target data TGT_DATA is stored in the memory device 110. Hereinafter, it will be described a method of determining a target address by the memory system 100 with reference to FIGS. 11 to 12.

FIG. 11 illustrates an example in which a memory system 100 determines a target address according to embodiments of the present disclosure.

Referring to FIG. 11, if the length of the idle time belongs to a second time period among the plurality of time periods, the memory controller 120 of the memory system 100 may select a target address based on a plurality of addresses actually referenced by a command previously received from the host HOST after a previous idle time belonging to the second time period has elapsed. In this case, the second time period may be the same time period as the above-described first time period or may be a different time period.

Specifically, with respect to a plurality of addresses referenced by a read command previously received from the host HOST after a previous idle time belonging to the second time period has elapsed, the memory controller 120 may select the target address based on the number of times of reference to each of the plurality of addresses.

In FIG. 11, the address A is referenced 3 times, the address B is referenced 5 times, and the address C is referenced 2 times after the idle time belonging to the second time period has elapsed. In this case, the memory controller 120 may select the address B, which is the address having the largest number of times of reference thereto, as the target address. That is, the memory controller 120 may prefetch the data stored in the address B into the read buffer RD_BUF.

Moreover, the case where the address having the largest number of times of reference thereto is one that has been described as an example, but there may be plural addresses having the largest number of times of reference thereto.

Figure 12:
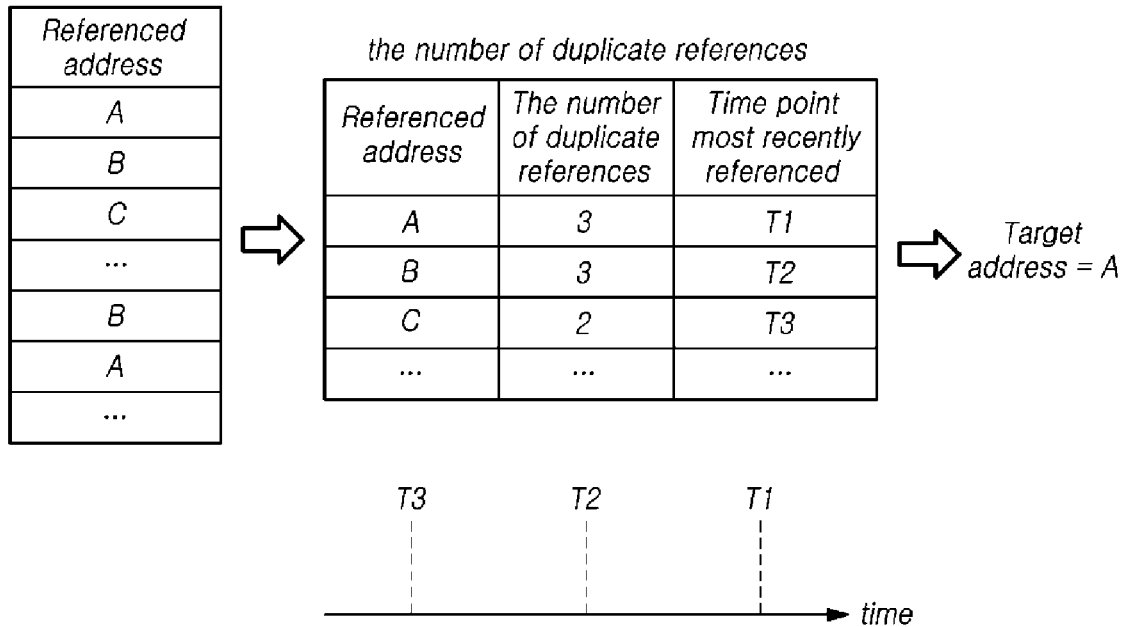
FIG. 12 illustrates another example in which a memory system determines a target address according to embodiments of the present disclosure.

FIG. 12 illustrates another example in which a memory system 100 determines a target address according to embodiments of the present disclosure.

In FIG. 12, after the idle time belonging to the second time period has elapsed, the address A is referenced 3 times, the address B is referenced 3 times, and the address C is referenced 2 times.

In this case, the memory controller 120 may select one of the address A and the address B, which is an address having the largest number of times of reference thereto, as the target address.

In this case, the memory controller 120 may select the most recently referenced address from among the address A and the address B as the target address. In FIG. 12, a time point at which the address A is most recently referenced is T1, and a time point at which address B is most recently referenced is time point T2. Since T1 is more recent than T2, the memory controller 120 may select the target address as the address A.

Figure 13:
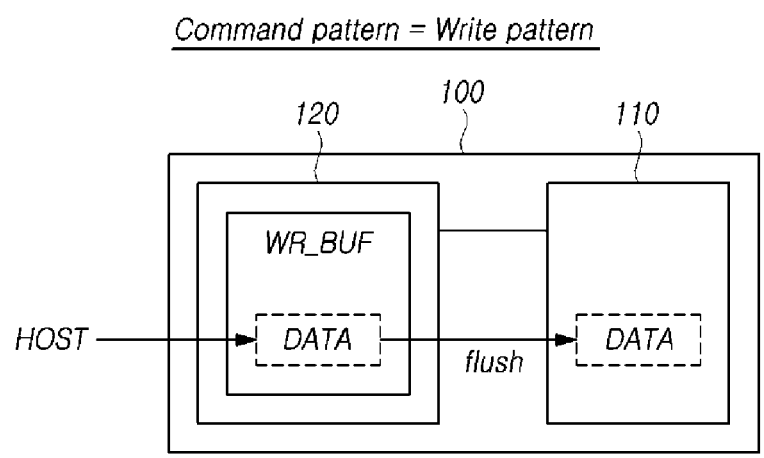
FIG. 13 illustrates another example in which a memory system according to embodiments of the present disclosure executes an operation corresponding to a command pattern.

FIG. 13 illustrates another example in which a memory system 100 according to embodiments of the present disclosure executes an operation corresponding to a command pattern.

Referring to FIG. 13, in the case that the command pattern of a command expected to be received from the host is a write pattern, the memory system 100 may execute an operation corresponding to the write pattern.

In FIG. 13, the memory controller 120 of the memory system 100 may flush all or part of data stored in an internal write buffer WR_BUF to a memory device 110.

The write buffer WR_BUF is a buffer for storing write-requested data from the host HOST in order to process a write command received from the host HOST. For example, the write buffer WR_BUF may be located in the working memory 125 of the memory controller 120 similar to the read buffer RD_BUF described above with reference to FIG. 10.

That is, the memory controller 120 flushes all or part of the data stored in the write buffer WR_BUF to the memory device 110 in advance before the host HOST requests to write new data. Therefore, it is possible to reduce the time required to store the data newly requested by the host HOST in the write buffer WR_BUF.

Figure 14:
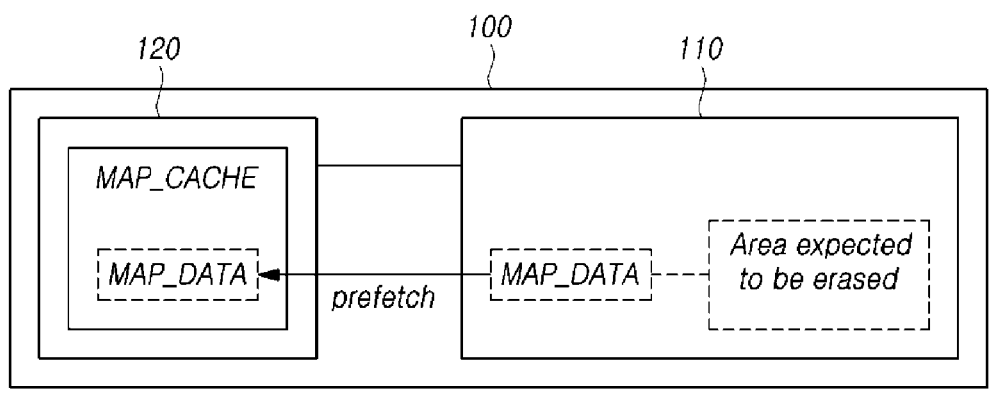
FIG. 14 illustrates another example in which a memory system according to embodiments of the present disclosure executes an operation corresponding to a command pattern.

FIG. 14 illustrates another example in which a memory system 100 according to embodiments of the present disclosure executes an operation corresponding to a command pattern.

Referring to FIG. 14, if the command pattern of a command expected to be received from the host HOST is an erase pattern, the memory system 100 may execute an operation corresponding to the erase pattern.

In FIG. 14, the memory controller 120 of the memory system 100 may prefetch the map data MAP_DATA corresponding to an area where an erase operation is expected to be executed in the memory device 110 to a map cache MAP_CACHE. The map data is data indicating mapping information between a logical address on the host HOST and a physical address on the memory device 110. In this case, the area where an erase operation is expected to be executed may be determined, for example, as an area (e.g. memory block) in which only invalid data is stored. For another example, the area where an erase operation is expected to be executed may be determined as an area that the read count is greater than or equal to the preset threshold read count.

The map cache MAP_CACHE may cache the map data MAP_DATA stored in the memory device 110. As an example, the map cache MAP_CACHE may be located on the working memory 125 of the memory controller 120 similar to the read buffer RD_BUF and the write buffer WR_BUF described above.

That is, before the host HOST executes an erase operation, the memory controller 120 may prefetch the map data corresponding to an area in which the erase operation is expected to be executed in the map cache MAP_CACHE, so that it is possible to reduce the time required to update the map cache MAP_CACHE in the process of executing the erase operation on the corresponding area.

Furthermore, the memory controller 120 of the memory system 100 may execute an operation corresponding to a command pattern other than the above-described read pattern, write pattern, and erase pattern.

For example, in the case that the command pattern of a command expected to be received from the host is a background pattern, the memory controller 120 of the memory system 100 may use an internal buffer for the purpose of executing a background operation (e.g., garbage collection (GC)) with a high possibility of execution, and may access data necessary for executing the background operation.

Figure 15:
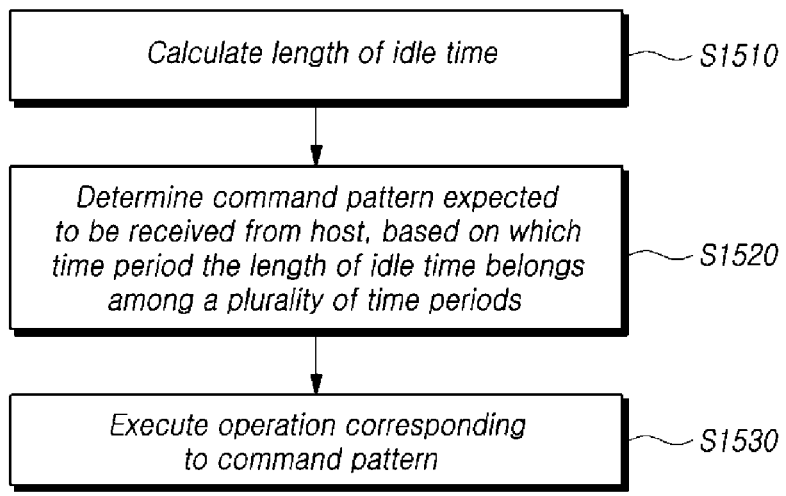
FIG. 15 illustrates an operating method of a memory system according to embodiments of the present disclosure.

FIG. 15 illustrates an operating method of a memory system 100 according to embodiments of the present disclosure. The operating method of a memory system 100 illustrated in FIG. 15 may be performed periodically or at a specific time point.

Referring to FIG. 15, the operating method of a memory system 100 may include calculating the length of the idle time, which is the time period in which a command is not received from the host HOST (S1510).

In addition, the operating method of a memory system 100 may include determining a command pattern indicating a command type of command expected to be received from the host HOST according to a time period to which the length of the idle time belongs among a plurality of set time periods (S1520).

In this case, the command type of command may be a read command, a write command, or an erase command. Further, the command pattern may be 1) a read pattern, 2) a write pattern, or 3) an erase pattern.

The determining of the command pattern (S1520) may include determining the command pattern based on history information corresponding to a first time period when the length of the idle time belongs to a first time period among a plurality of time periods. In this case, the history information corresponding to the first time period may include information of a command previously received from the host after a previous idle time belonging to the first time period has elapsed.

As an example, the determining the command pattern (S1520) may include searching for a command type of a command previously received from the host with the highest frequency based on the history information corresponding to the first time period, and determining the command pattern based on the searched command type.

As another example, the determining the command pattern (S1520) may include searching for a command type of a command most recently received from the host based on the history information corresponding to the first time period, and determining the command pattern based on the searched command type.

In addition, the operating method of a memory system 100 may include executing an operation corresponding to the command pattern determined in S1520 (S1530).

For example, the executing the operation corresponding to the command pattern (S1530) may include, when the command pattern is a read pattern, determining a target address where target data is stored in the memory device 110. The target data is to be prefetched to a read buffer RD_BUF, which stores data read from the memory device 110 to process a read command received from the host HOST. In addition, the step of executing the operation corresponding to the command pattern (S1530) may include prefetching target data stored in the target address into the read buffer RD_BUF.

In determining the target address, when the length of the idle time belongs to the second time period among the plurality of time periods, the target address may be determined based on the number of times of reference to each of a plurality of addresses referenced by a read command previously received from the host after a previous idle time belonging to the second time period has elapsed.

In determining the target address, if there are plural addresses having a largest number of times of reference thereto among the plurality of addresses, the target address may be determined as the most recently referenced address among the addresses having the largest number of times of reference thereto.

As another example, the executing the operation corresponding to the command pattern (S1530) may include, when the command pattern is a write pattern, flushing all or part of the data stored in a write buffer WR_BUF, which stores data write-requested by the host HOST, into the memory device 110 in order to process the write command received from the host HOST.

As another example, the executing the operation corresponding to the command pattern (S1530) may include, if the command pattern is the erase pattern, prefetching the map data MAP_DATA corresponding to the area where the erase operation is expected to be executed in the memory device 110 into a map cache MAP_CACHE. In this case, the area where an erase operation is expected to be executed may be determined, for example, as an area (e.g. memory block) in which only invalid data is stored. For another example, the area where an erase operation is expected to be executed may be determined as an area that the read count is greater than or equal to the preset threshold read count.

Figure 16:
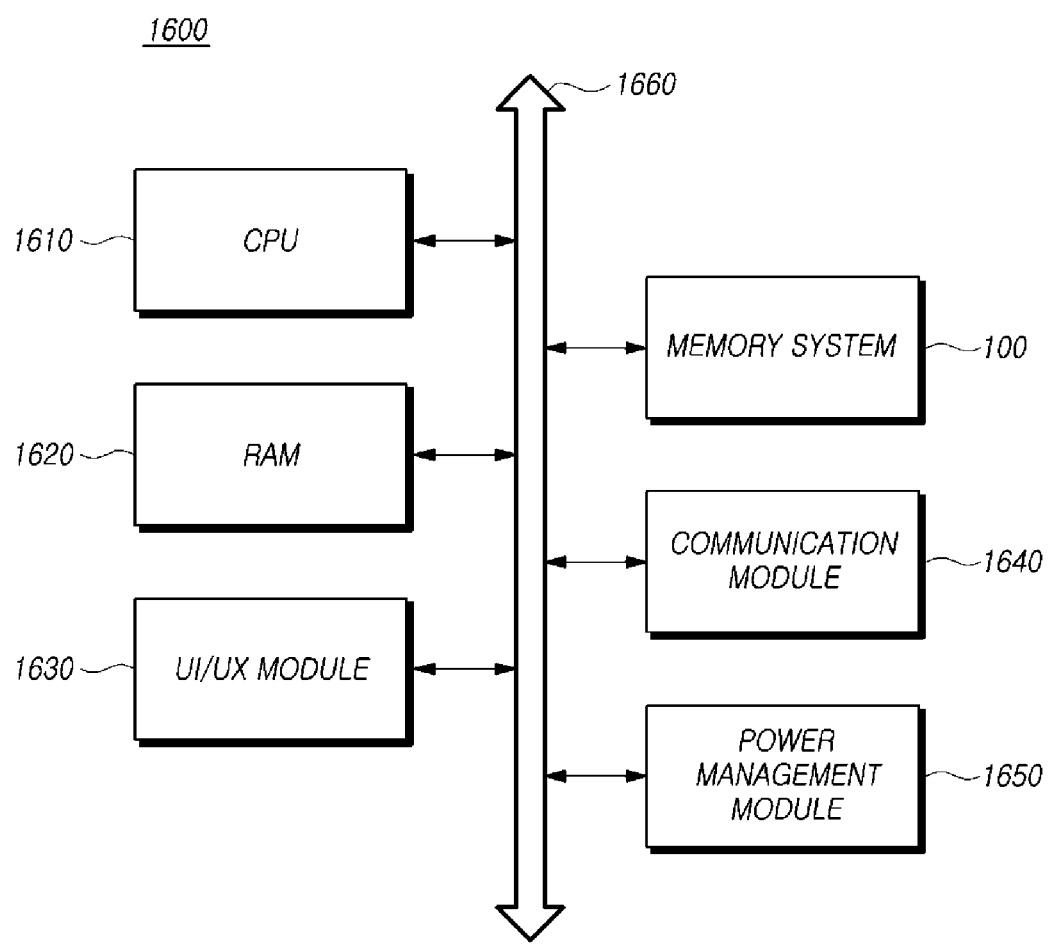
FIG. 16 is a diagram illustrating the configuration of a computing system based on some embodiments of the disclosed technology.

FIG. 16 is a diagram illustrating the configuration of a computing system 1600 based on an embodiment of the disclosed technology.

Referring to FIG. 16, the computing system 1600 based on an embodiment of the disclosed technology may include: a memory system 100 electrically connected to a system bus 1660; a CPU 1610 configured to control the overall operation of the computing system 1600; a RAM 1620 configured to store data and information related to operations of the computing system 1600; a user interface/user experience (UI/UX) module 1630 configured to provide the user with a user environment; a communication module 1640 configured to communicate with an external device as a wired and/or wireless type; and a power management module 1650 configured to manage power used by the computing system 1600.

The computing system 1600 may be a personal computer (PC) or may include a mobile terminal such as a smartphone, a tablet or various electronic devices.

The computing system 1600 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. A memory system comprising:
a memory device for storing data; and
a memory controller configured to:
control the memory device to execute a command received from a host,
determine, according to a time period to which a length of idle time belongs among a plurality of set time periods, a command pattern indicating a command type of a command expected to be received from the host, and
execute an operation corresponding to the command pattern,
wherein the idle time is a time period in which a command is not received from the host.

2. The memory system of claim 1,
wherein the memory controller determines, when the length of the idle time belongs to a first time period among the plurality of time periods, the command pattern based on history information corresponding to the first time period, and
wherein the history information corresponding to the first time period comprises information on a command previously received from the host after a previous idle time belonging to the first time period has elapsed.

3. The memory system of claim 2, wherein the memory controller searches for a command type of a command previously received from the host with the highest frequency from the history information corresponding to the first time period, and determines the command pattern based on the searched command type.

4. The memory system of claim 2, wherein the memory controller searches for a command type of a command most recently received from the host from the history information corresponding to the first time period, and determines the command pattern based on the searched command type.

5. The memory system of claim 1, wherein the command type comprises a read command, a write command, an erase command or a background command, and the command pattern comprises a read pattern, a write pattern, an erase pattern or a background pattern.

6. The memory system of claim 5,
wherein the memory controller comprises a read buffer for storing data read from the memory device in order to process a read command received from the host, and
wherein, when the command pattern is the read pattern, the memory controller determines a target address at which target data is stored in the memory device, and prefetches the target data into the read buffer.

7. The memory system of claim 6, wherein, when the length of the idle time belongs to a second time period among the plurality of time periods, the memory controller selects the target address based on a number of times of reference to each of a plurality of addresses referenced by the read command previously received from the host after a previous idle time belonging to the second time period has elapsed.

8. The memory system of claim 7, wherein the memory controller selects, when there are plural addresses having the largest number of times of reference thereto, the most recently referenced address as the target address from among the addresses having the largest number of times of reference thereto.

9. The memory system of claim 5,
wherein the memory controller comprises a write buffer for storing write-requested data by the host in order to process the write command received from the host, and wherein, when the command pattern is the write pattern, the memory controller flushes all or part of the data stored in the write buffer to the memory device.

10. The memory system of claim 5,
wherein the memory controller comprises a map cache for caching map data stored in the memory device, and
wherein, when the command pattern is the erase pattern, the memory controller prefetches map data corresponding to an area where an erase operation is expected to be executed in the memory device into the map cache.

11. An operating method of a memory system comprising:
calculating a length of idle time, which is a time period in which a command has not been received from a host;
determining, according to a time period to which the length of the idle time belongs among a plurality of set time periods, a command pattern indicating a command type of a command expected to be received from the host; and
executing an operation corresponding to the command pattern.

12. The operating method of the memory system of claim 11,
wherein the determining the command pattern comprises determining, when the length of the idle time belongs to a first time period among the plurality of time periods, the command pattern based on history information corresponding to the first time period, and
wherein the history information corresponding to the first time period comprises information on a command previously received from the host after a previous idle time belonging to the first time period has elapsed.

13. The operating method of the memory system of claim 12, wherein the determining the command pattern comprises searching for a command type of a command previously received from the host with the highest frequency from the history information corresponding to the first time period, and determining the command pattern based on the searched command type.

14. The operating method of the memory system of claim 12, wherein the determining the command pattern comprises searching for a command type of a command most recently received from the host from the history information corresponding to the first time period, and determining the command pattern based on the searched command type.

15. The operating method of the memory system of claim 11, wherein the command type comprises a read command, a write command, an erase command or a background command, and the command pattern comprises read pattern, a write pattern, an erase pattern or a background pattern.

16. The operating method of the memory system of claim 15, wherein the executing the operation corresponding to the command pattern comprises, when the command pattern is the read pattern, determining a target address at which target data is stored in a memory device, and prefetching the target data from the memory device into a read buffer, which stores data read from the memory device in order to process a read command received from the host.

17. The operating method of the memory system of claim 16, wherein the determining the target address comprises, when the length of the idle time belongs to a second time period among the plurality of time periods, selecting the target address based on a number of times of reference to each of a plurality of addresses referenced by the read command previously received from the host after a previous idle time belonging to the second time period has elapsed.

18. The operating method of the memory system of claim 17, wherein the determining the target address comprises, when there are plural addresses having the largest number of times of reference thereto, selecting the most recently referenced address as the target address from among the addresses having the largest number of times of reference thereto.

19. The operating method of the memory system of claim 15, wherein the executing the operation corresponding to the command pattern comprises, when the command pattern is the write pattern, flushing all or part of data stored in a write buffer, which stores write-requested data by the host in order to process the write command received from the host, to a memory device.

20. The operating method of the memory system of claim 15, wherein the executing the operation corresponding to the command pattern comprises, when the command pattern is the erase pattern, prefetching map data corresponding to an area where an erase operation is expected to be executed in a memory device into a map cache.

* * * * *